UNITED STATES PATENT OFFICE.

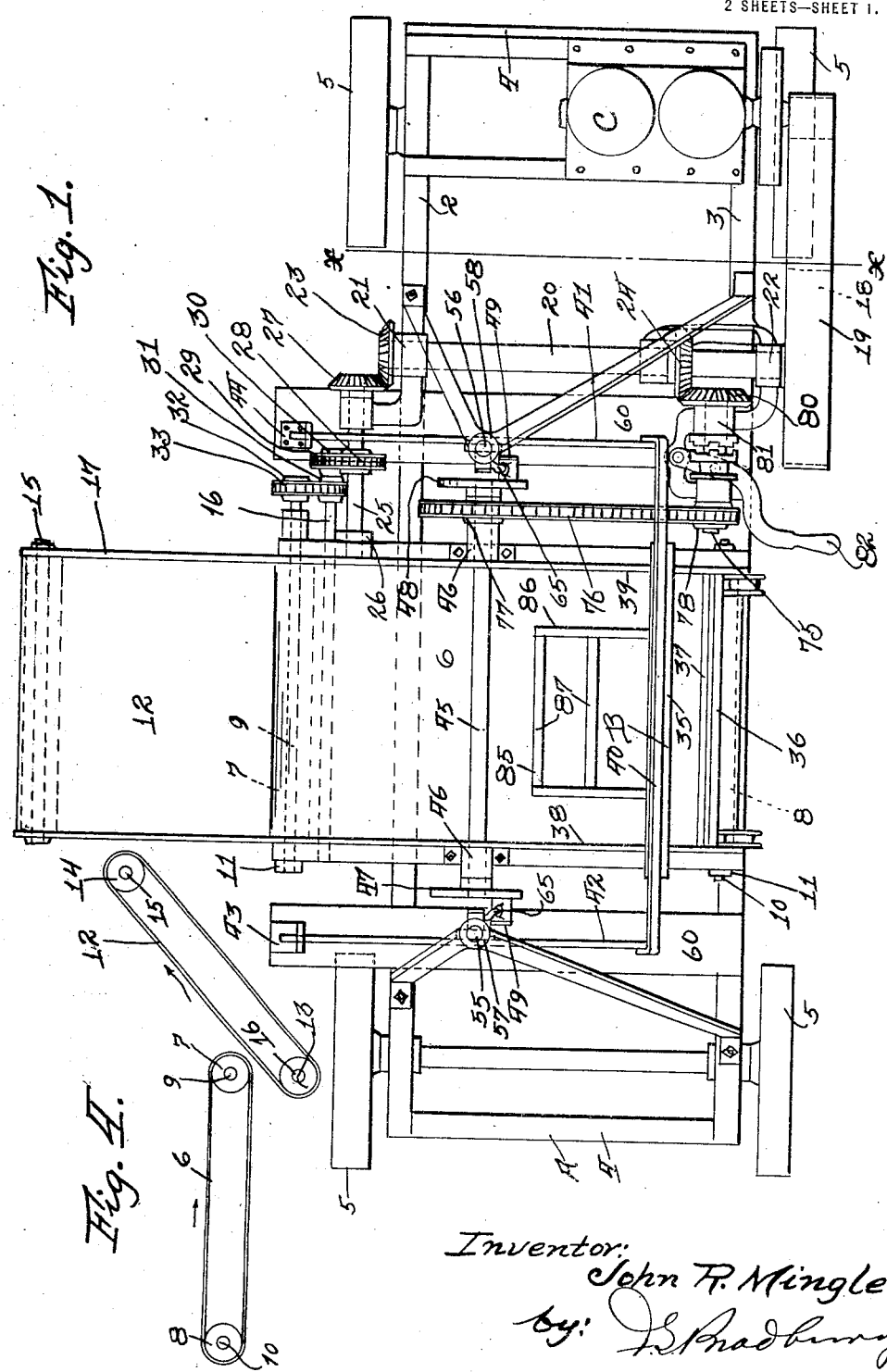

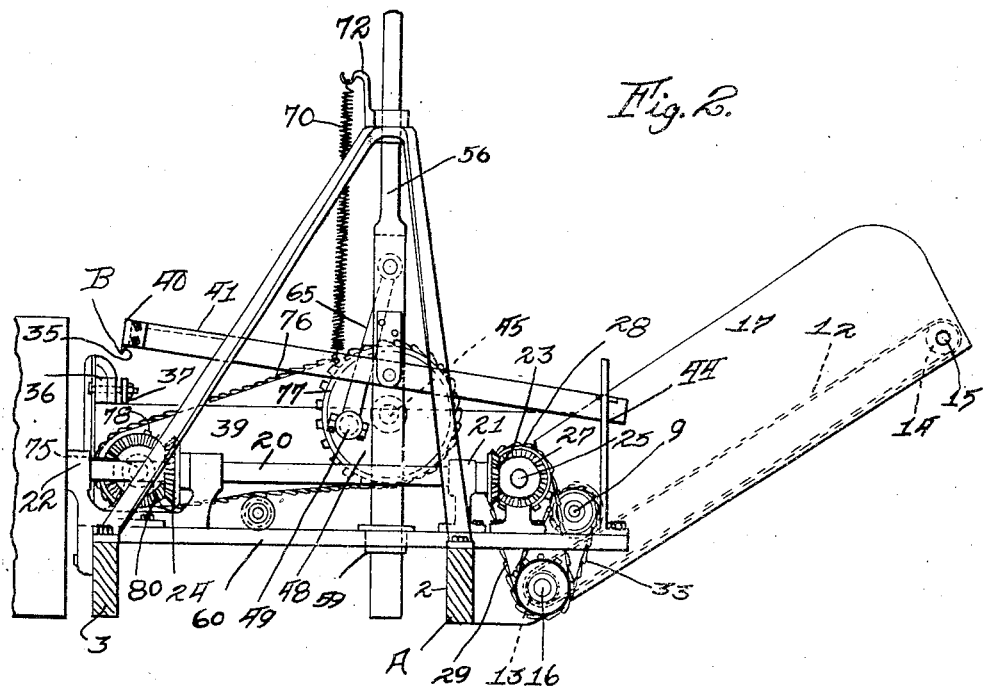

JOHN R. MINGLE, OF ANTHONY, KANSAS.

CORN-HEADER.

1,349,847.  Specification of Letters Patent.  Patented Aug. 17, 1920.

Application filed December 15, 1916. Serial No. 137,254.

*To all whom it may concern:*

Be it known that I, JOHN R. MINGLE, a citizen of the United States, residing at Anthony, in the county of Harper and State of Kansas, have invented a new and useful Improvement in Corn-Headers, of which the following is a specification.

This invention relates to improvements in machines for removing heads from corn, and more particularly is designed for the purpose of removing the heads from Kafir corn stalks after the corn has been cut with a binder and placed in large shocks in the field. In certain parts of the country notably the south-western portion of the United States, large and small fields are planted to Kafir corn and during the latter part of August, or at maturity, the corn is cut with a binder and assembled in large shocks in the field, the fodder to be used as rough feed in the winter months, and the grain to be used as feed for all kinds of stock. It is therefore necessary to remove the heads from the stalks or fodder, so that they can be threshed or placed under shelter and kept in condition to feed stock.

The primary object of this invention therefore resides in the provision of a corn topping machine, wherein the corn or other grain is acted upon after having been previously cut and conditioned by a harvesting machine, the action of the machine separating the heads or tops of the corn from the stocks to permit subsequent use of either independent of the other. With the above and additional objects in view, this invention comprises the features of construction and combination of parts hereinafter more particularly described and claimed.

In the accompanying drawing forming part of this specification, Figure 1 is a plan of a machine constructed in accordance with my invention; Fig. 2 is a section of a detail taken upon the line X—X of Fig. 1; Fig. 3 is a front elevation of a detail, part of the structure being broken away, and Fig. 4 is a diagrammatic view of the conveyers employed showing the relative position which they assume.

In the drawing, A represents the main frame of a vehicle, comprising as illustrated a pair of side sills 2 and 3 and cross sills 4, which are suitably braced or buttressed to produce a rigid rectangular frame. This frame is carried by the supporting wheels 5, by which the entire machine can be easily transported from one shock to another, or from place to place convenient for use. Upon this frame in substantially horizontal position is a platform canvas 6 in the form of an endless conveyer belt traveling around a pair of end rollers 7 and 8, which have their shafts 9 and 10 respectively journaled in suitable bearings 11 carried by the frame. The conveyer belt is arranged to move transversely of the frame and is adapted to convey the tops which are cut from the fodder corn by the cutter B, to be hereinafter described, from below said cutter and on to the lower end of an elevating belt 12, which elevates the tops and is adapted to deposit them in a wagon which is driven along under the delivery end of the elevator. The elevating belt is carried by the belt rollers 13 and 14, the shafts 15 and 16 of which are journaled in the guard frame 17, which is mounted upon the main frame A.

Motion is transmitted from a prime motor such as a gasolene engine C, on the main frame, to the drive pulley 18, by a driving belt 19, said pulley being mounted upon the main drive shaft 20 across the frame. The drive shaft 20 is journaled in the bearings 21 and 22, and is provided with a pair of bevel gears 23 and 24. A counter shaft 25 journaled in a portion of the bearing 21 and in a bearing 26 on a side of the elevating conveyer guard frame carries a bevel gear 27, the teeth of which mesh with the teeth of the bevel gear 23. This counter shaft carries a sprocket 28 and a drive chain 29 passing over said sprocket and around another sprocket 30 on the shaft 16 completes driving connection from the shaft 20 to the elevating belt. A second sprocket 31 on the shaft 16 and a sprocket 32 on the shaft 9 with a chain belt 33 passing around them serve to transmit motion from the shaft 16 to the shaft 9 on which the conveyer roll 7 is mounted, thereby driving the platform belt, which receives and conveys tops of the corn stalks to the elevating belt.

Arranged above the platform belt is the cutter B for cutting the tops off of the fodder or corn stalks. This cutter is in the form of a reciprocable blade 35, the edge of which coöperates with a pair of spaced stationary cutter bars 36 and 37 forming a block and which are supported rigidly upon the sides or guards 38 and 39 of the platform conveyer, and which form a continuation of the guards 17 of the elevating conveyer. The knife block coöperates with the cutter blade 35, in causing a clean cut to be made. The blade 35 is secured to a bale or U-shaped frame 40, the sides 41 and 42 of which have their ends slidably and pivotally secured in a pair of brackets 43 and 44. Journaled across and above the platform conveyer is a shaft 45, which is mounted in the bearings 46 secured to the guards of the platform conveyer. The ends of this shaft are provided with crank members 47 and 48 in the form of disk plates on the outer faces of which pitman bearings 49 project. Arranged on each side of the platform conveyer and adjacent to and between the ends of each of the sides of the bale member 40 are two vertically reciprocable rods or standards 55 and 56, which slide vertically near their upper ends in upwardly extending bearing members 57 and 58 which are rigidly mounted upon the supports 60 across and forming part of the body frame A of the machine. The lower ends of the reciprocable standards 55 and 56 slide longitudinally through bearings 59, which are mounted upon said supports 60. By this construction the standards 55 and 56 are free to slide vertically, but are pivotally attached to side members 41 and 42 between their ends. The standards are also operatively connected to the crank members 47 and 48 by the pitmen 65, whereby as the shaft 45 revolves, the standards are caused to reciprocate up and down simultaneously, thus reciprocating the cutter and causing the blade to successively pass into the space between the members 36 and 37 constituting the knife block or rest. By arranging the parts as stated the blade reciprocates vertically thereby making a cleaner cut than if moving in the arc of a circle and prevents the grain ends from clogging the cutter. To assist in evenly balancing the knife supporting bale member to reduce vibration of the machine, helical tension springs 70 are secured to the sides 41 and 42 of the bale member and to the reach members 72 which are mounted upon the upper ends of the bearing members 57 and 58 and extend upwardly to lengthen the reach of the springs and permit longer springs to be employed which will impart more even elasticity throughout the stroke of the cutter blade and its bale support. The shaft 45 receives motion from a two piece driven shaft 75 by a chain belt 76 passing over sprocket wheels 77 on the shaft 45 and 78 on one member of the shaft 75. The two members of shaft 75 are thrown into and out of connection by a clutch 79 operated by the handle 82. The driving member of the shaft 75 carries a bevel gear 80, the teeth of which mesh with the teeth of the bevel gear 24 on the main shaft 20. The members of the shaft 75 are journaled in a suitable bearing 81 carried by the main frame of the machine.

To prevent the corn tops from flying up when cut from the stalks a spring guard 85 comprising spring arms 86 secured to body of the bale 40 and cross bars 87 between said arms, is arranged to catch and hold the tops down when the stalks are placed below the cutter on the cutter block, thereby causing the severed top to fall directly upon the conveyer. This form of spring guard coöperates with the bale frame most effectively to hold the stock heads down during the cutting action and to direct the severed heads onto the conveyer below.

In operation the machine is transported from one shock of corn to another and the grain heads removed from the fodder by placing the stalks over the cutter block and allowing the knife blade 35 to cut them off. The heads then drop upon and are carried by the conveyer members and elevated into a wagon or other receptacle awaiting them at the delivery end of the elevating belt. When the heads have been removed the fodder is either placed in piles or reshocked where they formerly stood. This operation is very rapid and the work is easy. The efficiency of the machine serves to accomplish the results of removing the heads from Kafir corn with a minimum amount of labor.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. In a corn header, the combination with a conveyer for carrying corn stock heads, a reciprocable bale having side arms pivoted to permit reciprocation of the body of the bale, a cutter blade above said conveyer on the body of the bale, a stationary chopper block with which said blade coöperates to sever the heads from the stocks, means for reciprocating said bale and cutter blade, and a spring guard carried by the bale and arranged to hold the heads down during the cutting action of the blade and cause them to drop onto the conveyer, said guard comprising rearwardly extending resilient side arms between the sides of the bale and secured rigidly by their forward ends to the body of the bale and transverse bars secured across the space between said resilient arms.

2. In a corn header, the combination with a conveyer for carrying stock heads, and a suitable frame, a bale having side arms, slidably and pivotally mounted on said frame so that its body end is arranged over said conveyer and adapted to reciprocate, a cutting blade mounted on the body of the bale, a pair of upwardly extending standards slidably mounted on said frame and movably attached to said arms, means for reciprocating said standards, an upwardly projecting reach from said frame and above said bale and a contraction spring connected to the upper end of said reach and to the forward portion of said bale for raising the bale and blade, said reach being adapted to increase the distance between the attaching ends of the spring whereby a greater length of spring may be employed, and a chopper block with which said blade is adapted to coöperate.

In testimony whereof I have signed my name to this specification.

JOHN R. MINGLE.